United States Patent
Alpers

[11] 3,755,814
[45] Aug. 28, 1973

[54] PRECISION TRANSPONDER SYSTEM
[75] Inventor: Frederick C. Alpers, Riverside, Calif.
[73] Assignee: The United States of America as represented by the Secretary of the Navy, Washington, D.C.
[22] Filed: Feb. 8, 1971
[21] Appl. No.: 113,748

[52] U.S. Cl............ 343/18 D, 343/6.5 R, 343/17.1, 343/18 E
[51] Int. Cl.............................................. G01s 9/06
[58] Field of Search...................... 343/6.5 R, 6.8 R, 343/6.5 LC, 6.8 LC, 18 E, 18 B, 18 D, 17.1 R

[56] References Cited
UNITED STATES PATENTS
3,172,107   3/1965   Morris........................ 343/6.5 R X
3,098,227   7/1963   Letsch et al...................... 343/18 E
2,862,203   11/1958  Skaraeus et al.................. 343/18 E
3,375,515   3/1968   Novikoff........................... 343/18 E
3,504,366   3/1970   Tolles et al....................... 343/18 E Primary Examiner—Malcolm F. Hubler
Attorney—R. S. Sciascia, G. J. Rubens, J. W. McLaren and T. M. Phillips

[57] ABSTRACT

A gas discharge tube is placed in the transmission line of a radar to briefly interrupt the transmitted signal to form a notched pulse that is transmitted to a transponder. The notching is reproduced in the responding signal from the transponder by using the incoming RF signal itself to build up the responding signal. By this means, the uncertainty of the delay associated with the transponder is limited to a few cycles of radar frequency rather than a much larger time interval. At the radar receiver the distance to the transponder and back is then determined with high accuracy by measuring the time interval between the notch on the transmitted signal and that on the responding signal.

5 Claims, 5 Drawing Figures

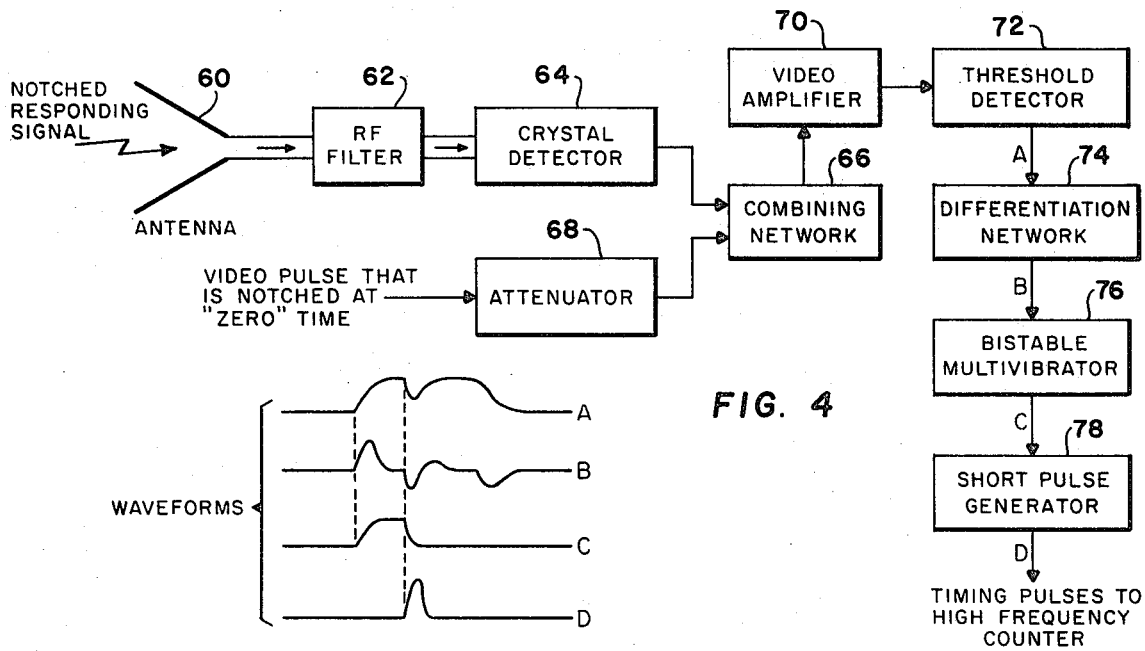
FIG. 4
FIG. 5
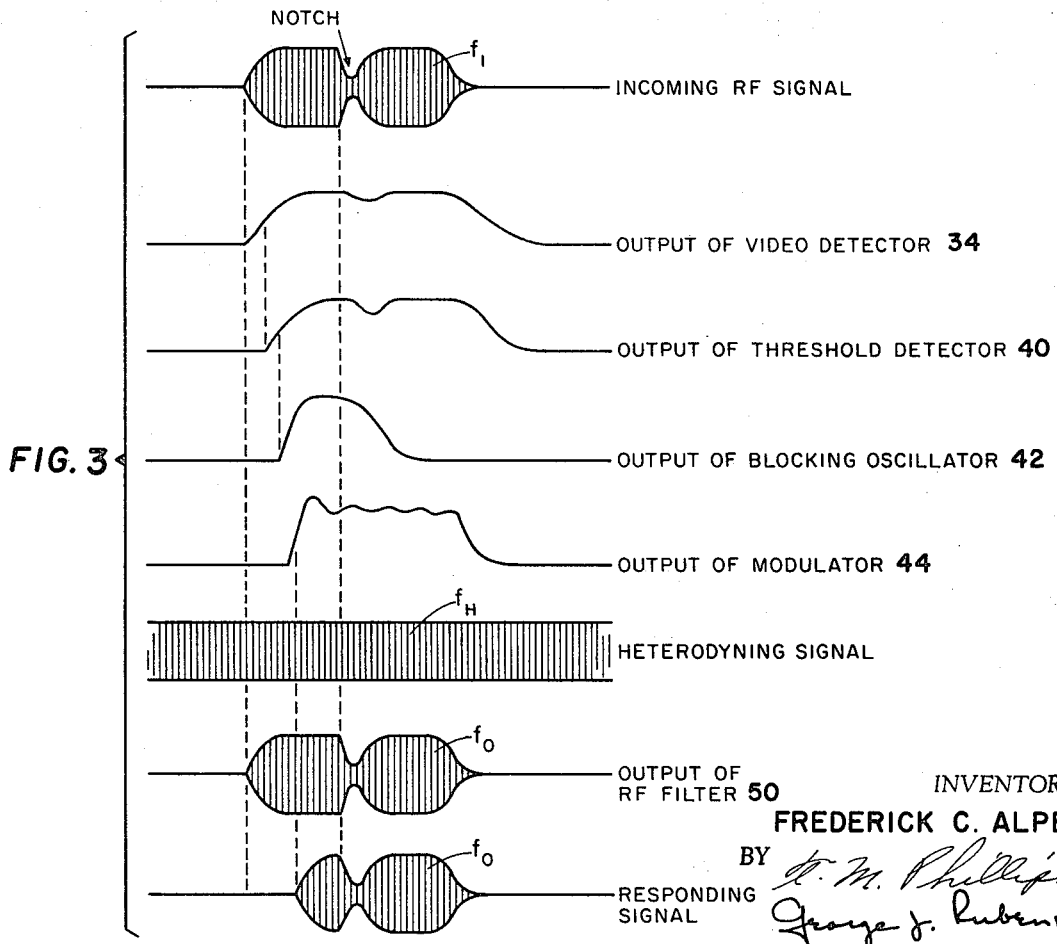
FIG. 3

PRECISION TRANSPONDER SYSTEM

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

When using a transponder for radio ranging or other pulse relay purposes it is desirable that there be no delay in the transponder, i.e., that the responding signal commence immediately with the start of the incoming signal. Present day technology does not permit this and existing transponders typically have response delays on the order of several hundred nanoseconds. Up to a hundred nanoseconds of this delay can be due to inherent delays and rise time within the thresholding, blocking oscillator, and modulator circuits; and, if a super heterodyne receiver is used, another hundred nanoseconds could be introduced by the intermediate frequency amplifier stages and intermediate frequency to video detector. In radar ranging, 200 nanoseconds of delay would result in the measured range being a hundred feet longer than actual range. Calibration delay subtraction systems have been used but suffer from the disadvantage that the system accuracy is dependent upon the circumstances under which the transponder is being used. In some instances a variation in the amount of ± 20 percent of the average delay may be tolerated. In cases of targeting or weapon delivery systems, this amount of delay cannot be tolerated. The present invention provides a transponder system in which the effective transponder delay is reduced to only a few nanoseconds.

Accordingly, an object of the present invention is to provide a transponder system in which the effective transponder delay is reduced from several hundred to a small number of nanoseconds.

Another object of the invention is to provide a transponder system in which the variations in delay are reduced to a point where they are no longer of real significance for targeting and weapon delivery systems in present day use.

Another object of the invention is to provide a transponder system in which the effective transponder delay is reduced by "notching" or a brief interruption of the signal in the transmitter, and reproducing the notched signal in the transponder.

Other objects and many of the attendant advantages of this invention will be readily appreciated as the same becomes better understood by reference to the following detailed description when considered in connection with the accompanying drawings wherein:

FIG. 3 is a diagram of waveforms used in explaining the operation of the circuit of FIG. 2;

FIG. 4 is a block diagram of a receiving and notch timing circuit for generating precise timing pulses in response to the notches on the transmitter and responding pulses, respectively.

FIG. 5 is a diagram of waveforms used in explaining the operation of the circuit of FIG. 4.

Figure 1:
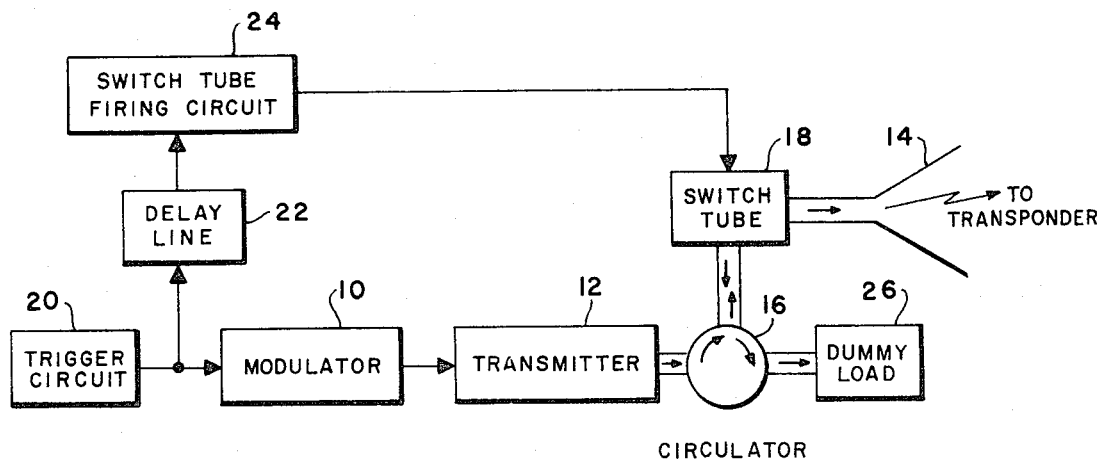
FIG. 1 is a block diagram of a transmitter circuit for forming the notched pulse for transmission.

Referring now to FIG. 1 there is shown a modulator 10 connected to an RF energy transmitter 12 which has its output coupled to a transmitting antenna 14 through a circulator 16 and switch tube 18. A trigger circuit 20 for triggering modulator 10 is coupled to modulator 10 and also coupled through a delay line 22 to switch tube firing circuit 24. The output of switch tube firing circuit 24 is connected to switch tube 18. A dummy load 26 is connected to circulator 16.

In operation, pulse modulator 10 controls transmitter 12 which generates a pulsed RF signal. Circulator 16 directs this signal out via switch tube 18 (which may be of the gaseous switching type) to antenna 14, from which the RF signal is propagated towards the remote transponder. In its normal unactivated condition switch tube 18 should be matched so as to present only a slight attenuation of an RF signal passing through it. As pulse modulator 10 is triggered by trigger circuit 20, a trigger pulse also is directed through delay line 22 and firing circuit 24 to switch tube 18. The purpose of delay line 22 is to introduce a delay in the firing of switch tube 18 so that the notching action takes place well after the rise of the RF signal. For reasons which will become apparent later, this delay must exceed the delay between the rise of the incoming signal and that of the responding signal in the transponder. When switch tube 18 fires, the RF signal reaching it, or a major portion of that signal is reflected back to circulator 16 and is directed to dummy load 26. The duration of the firing of switch tube 18 should be on the order of ten nanoseconds. As the capacitive energy supplied by firing circuit 24 decays, the RF signal then commences to pass through switch tube 18 with little attenuation, and the radiated signal after notching returns to the same level as before notching.

Figure 2:
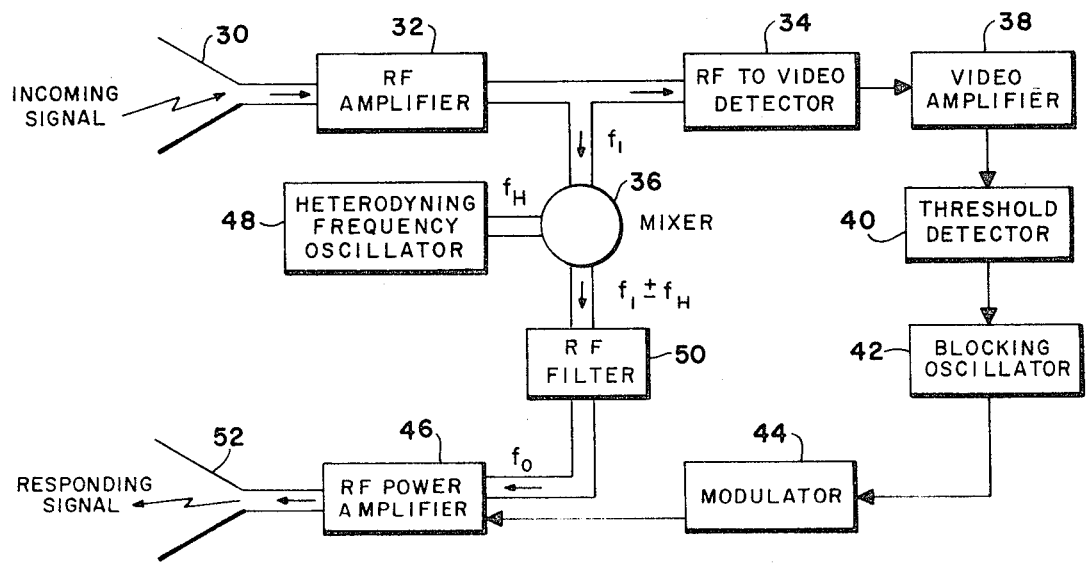
FIG. 2 is a block diagram of the transponder for receiving and acting on the transmitted notched pulse.

Referring to FIG. 2 there is shown a receiving antenna 30 for receiving incoming signals that are transmitted from antenna 14 of FIG. 1. The signals received at antenna 30 are coupled to an RF amplifier 32. The output of RF amplifier 32 is fed to an RF to video detector 34 and to a mixer circuit 36. The output video signal from detector 34 is amplified in video amplifier 38 and detected in threshold detector 40 which produces the trigger for blocking oscillator 42. The output signal from blocking oscillator 42 activates pulse modulator 44 whose output signal is fed to RF power amplifier 46. A heterodyning frequency oscillator 48 is fed as a second input to mixer circuit 36. The output of mixer circuit 36 is fed to an RF filter 50 for filtering out one of the RF frequencies. The output from RF filter 50 is fed to RF power amplifier 46. The output of RF power amplifier 46 is fed to a transmitting antenna 52 which transmits the responding signal in the direction of the receiving antenna of the radar transmitting the original notched pulse signal.

In FIG. 2, the incoming signal at antenna 30 is amplified by RF amplifier 32 rather than in an IF amplifier in order to avoid appreciable signal delay in the amplification process. The amplified RF signal is fed to both a detector 34 and a mixer 36. Detector 34 converts the signal to a video pulse, which is then amplified and passed through a threshold detector 40. The output of threshold detector 40 activates blocking oscillator 42 which, in turn, turns on pulse modulator 44 which supplies power for the operation of the transponder transmitter (this is RF power amplifier 46). The signal from RF amplifier 32 which is at the incoming signal frequency ($f_1$), is mixed with the heterodyning signal ($f_H$) to produce two frequency signals ($f_1 + f_H$ and $f_1 - f_H$), each of which carries the pulse modulation (including the notch) that is present on the incoming signal. RF filter 50 following mixer 36 is tuned to pass one of the two beat frequencies but rejects the other, and the signal that is passed becomes the output signal that is amplified by RF power amplifier 46 and is emitted as the responding signal from antenna 52. As shown by the waveforms of FIG. 3, even though a decay was encountered in the formation of the leading edge of the responding signal, no appreciable delay is involved in the transfer of the notch to the responding signal. However, because the leading portion of the signal from RF filter 50 reaches RF power amplifier 46 before amplifier 46 is activated by modulator 44, the notch occurs nearer to the front end of the responding signal than it did on the incoming signal.

The transponder heterodyning signal frequency ($f_H$) and the tuning of RF filter 50 (to one or the other of the two beat frequencies) are selected to provide the output frequency desired, which can be different for each transponder in cases where identification of particular responding signals is a problem. If response to an interrogating radar with a superheterodyne receiver is desired, $f_H$ may be made to be equal twice the intermediate frequency of the radar involved, and this, together with selection of the power image frequency, will result in a responding signal that is tuned to the unused image frequency of the radar receiver and is readily received along with any radar echo signal present.

The particular means selected for receiving and timing a notched signal from the transponder of FIG. 2 depends upon the function being performed; however, in any application the desired precision will only be obtained if the timing or clocking applies to the time of receiption of the notch rather than the leading edge of the responding signal. The circuit of FIG. 4 shows a crystal video type receiver with tuning provided by an RF filter. A receiving antenna 60 is coupled through an RF filter 62 to a crystal detector 64. The output of crystal detector 64 is fed to a combining network 66 which also has a video pulse that is notched at zero time and passed through an attenuator 68. The output of combining network 66 is amplified in video amplifier 70 and fed to a threshold detector circuit 72. The output of threshold detector 72 is differentiated in a differentiating network 74 and fed to bistable multivibrator 76. The pulse produced by multivibrator 76 is used to trigger short pulse generator 78. The output of short pulse generator 78 are timing pulses which are fed to a high frequency counter (not shown). In operation, the RF signal received at antenna 60 is converted directly to video by crystal detector 64, and the resultant video signal is amplified and threshold detected just as was done with the transponder itself. The video signal is then differentiated, resulting in a waveform of the type indicated by waveform B of FIG. 5. The leading (positive) pip in this differentiated waveform triggers a high response bistable multivibrator 76 into conduction on one side, and the ensuing negative pip, which results from the notch, returns multivibrator 76 to its original state. This trailing edge of the multivibrator triggers short pulse generator 78 (pulse duration of a few nanoseconds), which then provides a clocking pulse coincident with the notch in the video signal. Since the notch in the video signal at the output of threshold detectors 72 may lag the notch in the RF signal received at antenna 60 (because of delays in the video amplifier and threshold detector), which would reintroduce error, a video pulse notched at zero time is processed through the same circuitry after being attenuated to essentially the same amplitude as the detected signal from the transponder of FIG. 2. The insertion of the zero time in this manner permits use of a high frequency counter to precisely clock the time and reception of the notch in the transponder signal. Alternatively, the measured delay in processing the zero time notch through the circuit may be subtracted from the timing of the output signal corresponding to the transponder notch in order to ascertain the instant of arrival of the RF signal notch as opposed to the resulting video signal notch.

Obviously many modifications and variations of the present invention are possible in the light of the above teachings. It is therefore to be understood that within the scope of the appended claims the invention may be practiced otherwise than as specifically described.

What is claimed is:

1. In a precision transponder system the combination comprising:
   a. an RF frequency transmitter for transmitting an RF frequency pulses of a predetermined time duration, said pulses having a brief interruption of the transmitted energy at a point approximately intermediate the duration time of said pulse,
   b. a transmitting antenna,
   c. a circulator for directing the RF energy to said transmitting antenna,
   d. switching means connected in circuit with said circulator and said antenna and normally allowing RF energy to flow from said transmitter to said antenna,
   e. control circuit means coupled to said switching means for briefly interrupting the flow of RF energy in said switching means,
   f. a transponder circuit means for receiving said transmitted pulses and being responsive to said received signals for generating responding signals so that the brief interruptions in said responding signals correspond approximately with the brief interruptions in the received signals,
   g. receiving circuit means for receiving said responding signals and being responsive thereto for generating a clock pulse coincident with the occurrence of the brief interruptions in said responding signals.

2. The transponder system of claim 1 wherein said transponder circuit means includes:
   a. an antenna for receiving the signal pulses transmitted from said transmitting circuit,
   b. an RF amplifier coupled to said receiving antenna for amplifying the incomming RF signal,
   c. a mixer circuit having a first input coupled to said RF amplifier and a second input coupled to a heterodyning frequency oscillator for generating sum and difference frequency signals,
   d. an RF filter circuit coupled to said mixer circuit for passing only one of said sum and difference frequency signals,
   e. video detector circuit means coupled to said RF amplifier,
   f. modulator circuit means coupled to said video detector circuit means for generating an output modulating signal of approximately the same time duration of said received signal, g. an RF power amplifier coupled to said RF filler and to said modulator for generating an output responding signal having a brief interruption in time coincidence with the brief interruption of said received signal.

3. The transponder system of claim 1 wherein said clock pulse generating means includes:

a. a crystal detector for detecting the responding signal, b. a differentiation network coupled to said crystal detector, c. a bistable multivibrator coupled to said differentiation network and being responsive to the differentiated signal to generate an output pulse that stops with the beginning of the brief interruption of said responding signal, and d. a short pulse generator coupled to said bistable multivibrator for generating an output pulse in response to the start of decay of the output pulse of said bistable multivibrator.

4. The system of claim 1 wherein said switching means is a gaseous switching tube.

5. The system of claim 1 wherein said control circuit means includes the transmitter trigger circuit in circuit with a delay line.

* * * * *